United States Patent
Kira et al.

(10) Patent No.: US 9,005,035 B2
(45) Date of Patent: Apr. 14, 2015

(54) STORAGE MEDIUM STORING GAME PROGRAM, GAME APPARATUS, AND GAME CONTROLLING METHOD FOR CHANGING GAME PARAMETERS BASED ON GAME PROGRESS

(75) Inventors: Satoshi Kira, Kyoto (JP); Toshiharu Izuno, Kyoto (JP); Isao Okamoto, Tokyo (JP)

(73) Assignees: Nintendo Co., Ltd., Kyoto (JP); Kabushiki Kaisha Taito, Tokyo (JP)

( * ) Notice: Subject to any disclaimer, the term of this patent is extended or adjusted under 35 U.S.C. 154(b) by 963 days.

(21) Appl. No.: 12/552,551

(22) Filed: Sep. 2, 2009

(65) Prior Publication Data
US 2010/0292010 A1    Nov. 18, 2010

(30) Foreign Application Priority Data
May 18, 2009    (JP) ................................. 2009-119742

(51) Int. Cl.
G06F 17/00    (2006.01)
G06F 3/00    (2006.01)
G06F 3/03    (2006.01)
A63F 13/40    (2014.01)

(52) U.S. Cl.
CPC .............. *G06F 3/0325* (2013.01); *A63F 13/10* (2013.01); *A63F 2300/305* (2013.01); *A63F 2300/6027* (2013.01); *A63F 2300/638* (2013.01)

(58) Field of Classification Search
USPC ............................. 715/707, 708, 709; 463/43
See application file for complete search history.

(56) References Cited

U.S. PATENT DOCUMENTS 5,035,625 A * 7/1991 Munson et al. ................ 434/332
5,864,346 A * 1/1999 Yokoi et al. .................... 345/501
6,296,570 B1 10/2001 Miyamoto et al.
6,666,765 B2 * 12/2003 Vancura ............................ 463/9

(Continued)

FOREIGN PATENT DOCUMENTS

JP        07-284034    10/1995
JP        08-016348     1/1996

(Continued)

OTHER PUBLICATIONS

"Final Fantasy VIII" Game Manual. Squaresoft. 1999. Retrieved from the internet. Retrived on Dec. 4, 2011. <URL:http://www.replacementdocs.com/download.php?view.1175>.*

(Continued)

*Primary Examiner* — Dmitry Suhol
*Assistant Examiner* — Carl V Larsen
(74) *Attorney, Agent, or Firm* — Nixon & Vanderhye, P.C.

(57) ABSTRACT

A game apparatus includes a CPU, and when a virtual game is started, the CPU generates game image data and displays a corresponding game screen on a monitor. In the game screen, an operating instruction describing operation procedure is displayed and contents of the instruction changes according to a progress of the game. For example, as the game advances, an operating instruction including how to perform a new operation is displayed when a player object learns a new attack, or when a level (experience) of the player object increases or an operation level of the player increases. However, if the virtual game has not been played for a relatively long period of time, the operating instruction is displayed regardless of the progress of the game.

14 Claims, 15 Drawing Sheets

(56) References Cited

U.S. PATENT DOCUMENTS

| | | | |
|---|---|---|---|
| 8,042,045 B1* | 10/2011 | Sullivan et al. | 715/708 |
| 2005/0246638 A1* | 11/2005 | Whitten | 715/708 |
| 2006/0031245 A1* | 2/2006 | Krieglstein | 707/102 |
| 2007/0157093 A1* | 7/2007 | Karcher | 715/707 |
| 2009/0088233 A1* | 4/2009 | O'Rourke et al. | 463/7 |
| 2010/0058233 A1* | 3/2010 | Chan et al. | 715/810 |
| 2010/0190555 A1* | 7/2010 | Dutilly et al. | 463/43 |

FOREIGN PATENT DOCUMENTS

| | | |
|---|---|---|
| JP | 09-319291 | 12/1997 |
| JP | 10-295935 | 10/1998 |
| JP | 2002-172271 | 6/2002 |
| JP | 2006-180920 | 7/2006 |
| JP | 2006-204344 | 8/2006 |
| JP | 2008-027050 | 2/2008 |
| JP | 2008-194282 | 8/2008 |
| JP | 2008-237846 | 10/2008 |

OTHER PUBLICATIONS

Gamespot.com. "Final Fantasy VIII". Retrieved from the Internet. Retrieved on Dec. 6, 2011. <URL:http://www.gamespot.com/final-fantasy-viii/platform/ps>.*

"Final Fantasy VIII NMJNSANLNDC 006 GF Tutorial". YouTube video. Retrived from the Internet. Retrieved on Dec. 4, 2011 <URL: http://www.youtube.com/watch?v=702IyHsTcGY>.*

Red Brick Games. Redbrickgames.com. Online. Mar. 19, 2008. Accessed via the Internet. Accessed May 18, 2013. <URL:http://redbrickgames.com/blog/?cat=6>.*

* cited by examiner

FIG. 10

OPERATING INSTRUCTION DATA 502e

| DISPLAY LEVEL | CONTENT OF OPERATING INSTRUCTION |
|---|---|
| 1 | OPERATING INSTRUCTION (1) |
| 2 | OPERATING INSTRUCTION (2) |
| 3 | OPERATING INSTRUCTION (3) |
| 4 | OPERATING INSTRUCTION (4) |
| 5 | OPERATING INSTRUCTION (5) |
| ⋮ | ⋮ |
| n | OPERATING INSTRUCTION (n) |

STORAGE MEDIUM STORING GAME PROGRAM, GAME APPARATUS, AND GAME CONTROLLING METHOD FOR CHANGING GAME PARAMETERS BASED ON GAME PROGRESS

CROSS REFERENCE OF RELATED APPLICATION

The disclosure of Japanese Patent Application No. 2009-119742 is incorporated herein by reference.

BACKGROUND OF THE INVENTION

1. Field of the Invention

The present invention relates to a storage media storing a game program, game apparatuses, and game controlling methods. More specifically, the present invention relates to a storage medium storing a game program, a game apparatus, and a game controlling method for changing game parameters regarding a player or a player object according to a progress of the game.

2. Description of the Related Art

One example of the related art is disclosed in Japanese Patent Application Laid-Open No. 08-16348 [G06F 3/14] (Document 1) laid-open on Jan. 19, 1996. The information processor according to Document 1 starts a process of displaying a help message when a given period of time (for example, 5 seconds) has lapsed since a user last performed an input operation. Pieces of help message data respectively corresponding to a plurality of help messages are each set with a display control flag indicating Show "1" or Hide "0", and the piece of help message data of having a display control flag indicating "1" (Show) is read in a help message display process, thereby displaying a corresponding help message. However, the display control flag is selectively set according to the user's proficiency level (beginner, intermediate, or advanced), and the proficiency level is set by the user.

A different example of the related art is disclosed in Japanese Patent Application Laid-Open No. 07-284034 [H04N 5/445] (Document 2) laid-open on Oct. 27, 1995. The help information presenting device according to Document 2 stores a number of times of operation according to a key operation by a viewer as operation history information, and judges the viewer's proficiency level for operation control based on the stored operation history information. Based on the result of the judgment, the help message display process is executed.

However, while the information processor according to Document 1 shows or hides the help messages according to the user's proficiency level, as the proficiency level is set by the user's selection, the set proficiency level is not necessarily correct. In other words, the displayed help messages are not exactly appropriate.

In this respect, the help information presenting device according to Document 2 judges the viewer's proficiency level for operation control based on the operation history information regarding the number of times of operation according to the key operation. In other words, a degree of experience/inexperience is determined based on a number of times of operation, and in turn judged as the proficiency level. However, as the proficiency level is judged based on the number of times of operation, when the help information presenting device according to Document 2 is applied for a game apparatus, for example, and if the proficiency level is set to increase with a relatively small number of times of operation in order to accommodate an advanced game user, advanced help messages can be adversely displayed for a beginner game user when still inexperienced. On the other hand, if the proficiency level is set to increase with a relatively large number of times of operation in order to accommodate the beginner game user, help messages for operations that the advanced game user have already learned are adversely displayed, and this can be annoying for the advanced game user. In other words, the problem that the displayed help messages are not exactly appropriate also applies to Document 2.

SUMMARY OF THE INVENTION

Therefore it is a primary object of the present invention to provide a novel storage medium storing a game program, a novel game apparatus, and a novel game controlling method.

Further, another object of the present invention is to provide a storage medium storing a game program, a game apparatus, and a game controlling method, capable of presenting a necessary operating instruction when needed.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect of the invention is a storage medium storing a game program for a game apparatus that is provided with an operating instruction data storage means for storing operating instruction data for displaying an operating instruction for a virtual game on a display means, and that outputs a game screen of the virtual game to the display means, the game program makes a computer of the game apparatus to function as: a game data storage means that stores game data including at least data relating to progress of the virtual game in a storage medium; a timing determination means that determines whether or not it is time to display the operating instruction on the display means; a display determination means that, when it is determined to be the time to display the operating instruction by the timing determination means, determines whether or not to display the operating instruction based on the game data stored in the game data storage means; and an output means that, when it is determined to display the operating instruction by the display determination means, outputs the operating instruction data corresponding to the operating instruction to the display means.

In the first aspect of the invention, the game apparatus (12) is provided with the operating instruction data storage means (42e, 46) for storing the operating instruction data for displaying the operating instruction for the virtual game on the display means (34), and outputs the game screen (100) of the virtual game to the display means. The game program makes the computer of this game apparatus to function as the game data storage means (40, S7), the timing determination means (40), the display determination means (40, S35, S41, S45, S49), and the output means (40, S11). The game data storage means stores the game data including at least the data relating to the progress of the virtual game in a storage medium (42e, 46). The timing determination means determines whether or not it is time to display the operating instruction on the display means. When it is determined to be the time to display the operating instruction by the timing determination means, the display determination means determines whether or not to display the operating instruction based on the game data stored in the game data storage means. In other words, the operating instruction is displayed according to at least the progress of the virtual game. When it is determined to display the operating instruction by the display determination means, the output means outputs the operating instruction data corresponding to the operating instruction to the display means. Thus, the operating instruction is displayed on the display means.

According to the first aspect of the invention, as the operating instruction is displayed according to at least the progress of the virtual game, it is possible to display an operating instruction that is necessary when needed.

A second aspect of the invention is dependent on the first aspect of the invention, and the progress of the virtual game includes a number of game stages that have been cleared.

In the second aspect of the invention, the progress of the virtual game includes the number of the game stages (or phases or chapters) that have been cleared by the player, for example.

According to the second aspect of the invention, as the operating instruction is displayed according to the number of the cleared game stages, it is possible to display an adequate operating instruction depending on a degree of proficiency of the player.

A third aspect of the invention is dependent on the first or the second aspect of the invention, and the progress of the virtual game includes total play time of the virtual game.

In the third aspect of the invention, the progress of the virtual game includes the total play time of the virtual game. Generally, when the game has been played for an extended period of time, the degree of proficiency of the player and the degree of the progress of the virtual game are advanced.

According to the third aspect of the invention, as the operating instruction is displayed according to the total play time of the virtual game, similarly to the second aspect of the invention, it is possible to display an adequate operating instruction depending on the degree of proficiency of the player and the degree of the progress of the virtual game.

A fourth aspect of the invention is dependent on one of the first to the third aspects of the invention, and the operating instruction data storage means stores a plurality of contents for a single type of operating instruction that are different according to an operation level of a player, the computer is further functioned as an operation detection means that detects an operation by the player and an operation level determination means that determines the operation level of the player based on the detection result by the operation detection means, and the output means outputs the operating instruction data for the operating instruction of a content according to the operation level determined by the operation level determination means.

In the fourth aspect of the invention, the operating instruction data storage means stores the plurality of contents for the single type of the operating instruction that are different according to the player's operation level. In other words, the operating instruction according to the operation level is stored. The operation detection means (40, S77) detects the player's operation. The operation level determination means (40, S51, S53) determines the player's operation level based on the detected result by the operation detection means. The output means outputs the operating instruction data for the operating instruction of the content according to the operation level determined by the operation level determination means.

According to the fourth aspect of the invention, as the operating instruction of the content according to the player's operation level is displayed, it is possible to display the operating instruction that corresponds to the player's condition in addition to the progress of the virtual game.

A fifth aspect of the invention is dependent on the fourth aspect of the invention, and the operation level is a success rate of the operation.

In the fifth aspect of the invention, the operation level is the success rate of the operation. For example, the player's operation level is determined based on the proportion of a number of correct operations for the total number of times of operation.

According to the fifth aspect of the invention, similarly to the fourth aspect of the invention, it is possible to display the operating instruction that corresponds to the player's condition in addition to the progress of the virtual game.

A sixth aspect of the invention is dependent on the fourth aspect of the invention, and the operation level is a time period taken for the operation.

In the sixth aspect of the invention, the operation level is the time period taken for the operation. For example, the operation level is determined based on the time period from time when the player is allowed to perform the operation to time when the player actually perform the operation.

According to the sixth aspect of the invention, similarly to the fourth aspect of the invention, it is possible to display the operating instruction that corresponds to the player's condition in addition to the progress of the virtual game.

A seventh aspect of the invention is dependent on one of the fourth to the sixth aspects of the invention, and when the operating instruction is determined to be not displayed by the display determination means, the computer is further functioned as a time counting means that measures a time period during which no operation by the player has been detected by the operation detection means, and when the time period measured by the time counting means is over a given period of time, the output means outputs the operating instruction data that corresponds to the operating instruction that has been determined not to be displayed by the display determination means to the display means.

In the seventh aspect of the invention, when it is determined not to display the operating instruction by the display determination means ("YES" in S69), the time counting means (40, 502k, S89) measures the time period during which no operation by the player has been detected by the operation detection means. The output means, when the time period measured by the time counting means is over the given period of time ("YES" in S89), outputs the operating instruction data that corresponds to the operating instruction that has been determined not to be displayed by the display determination means to the display means.

According to the seventh aspect of the invention, when there has been no operation by the player for the given period of time or longer, the operating instruction that has once been determined not to be displayed is displayed, and therefore, it is possible to adequately display the operating instruction as needed such as a case when the operation procedure cannot be found.

An eighth aspect of the invention is dependent on one of the first to the seventh aspects of the invention, and when a new type of operation becomes available in the virtual game, the timing determination means determines that it is time to display an operating instruction for the new operation on the display means.

In the eighth aspect of the invention, when the new type of operation becomes available in the virtual game, the timing determination means determines that it is time to display the operating instruction for the new operation on the display means.

According to the eighth aspect of the invention, when the new type of operation is available, an instruction for the operation is displayed, and therefore, the player may learn that the new type of operation becomes available and how to perform the operation.

A ninth aspect of the invention is dependent on one of the first to the eighth aspects of the invention, and when a time period from a last play to a current play of the virtual game is over a predetermined time period, the display determination means determines to display the operating instruction regardless of the game data stored in the game data storage means.

In the ninth aspect of the invention, and when the time period from the last play to the current play of the virtual game is over the predetermined time period ("YES" in S35), the display determination means determines to display the operating instruction regardless of the game data stored in the game data storage means (S37).

According to the ninth aspect of the invention, when the time period during which the game has not been played is relatively long, the operating instruction is displayed regardless of the game data, and therefore, it is possible to prevent a detrimental effect in the play from occurring even if the operation procedure has been forgotten.

A tenth aspect of the invention is a game apparatus that is provided with an operating instruction data storage means for storing operating instruction data for displaying an operating instruction for a virtual game on a display means, and that outputs a game screen of the virtual game to the display means, the apparatus having: a game data storage means that stores game data including at least data relating to progress of the virtual game in the storage medium; a timing determination means that determines whether or not it is time to display the operating instruction on the display means; a display determination means that, when it is determined to be the time to display the operating instruction by the timing determination means, determines whether or not to display the operating instruction based on the game data stored in the game data storage means; and an output means that, when it is determined to display the operating instruction by the display determination means, outputs operating instruction data corresponding to the operating instruction to the display means.

According to the tenth aspect of the invention, similarly to the first aspect of the invention, it is possible to display an operating instruction that is necessary when needed.

An eleventh aspect of the invention is a game controlling method for a game apparatus that is provided with an operating instruction data storage means for storing operating instruction data for displaying an operating instruction for a virtual game on a display means and a game data storage means that stores game data including at least data relating to progress of the virtual game in a storage medium, and that outputs a game screen of the virtual game to the display means, the method including the steps of: (a) determining whether or not it is time to display the operating instruction on the display means; (b) determining, when it is determined to be the time to display the operating instruction by the step (a), whether or not to display the operating instruction based on the game data stored in the game data storage means; and (c) outputting, when it is determined to display the operating instruction by the step (b), operating instruction data corresponding to the operating instruction to the display means.

According to the eleventh aspect of the invention, similarly to the first aspect of the invention, it is possible to display an operating instruction that is necessary when needed.

The above described objects and other objects, features, and advantages of the present invention will become more apparent from the following detailed description of preferred embodiments when taken in conjunction with the accompanying drawings.

BRIEF DESCRIPTION OF THE DRAWINGS

FIG. 10 is an illustrative view showing one example of operation data shown in FIG. 9;

DETAILED DESCRIPTION OF THE PREFERRED EMBODIMENTS

Figure 1:
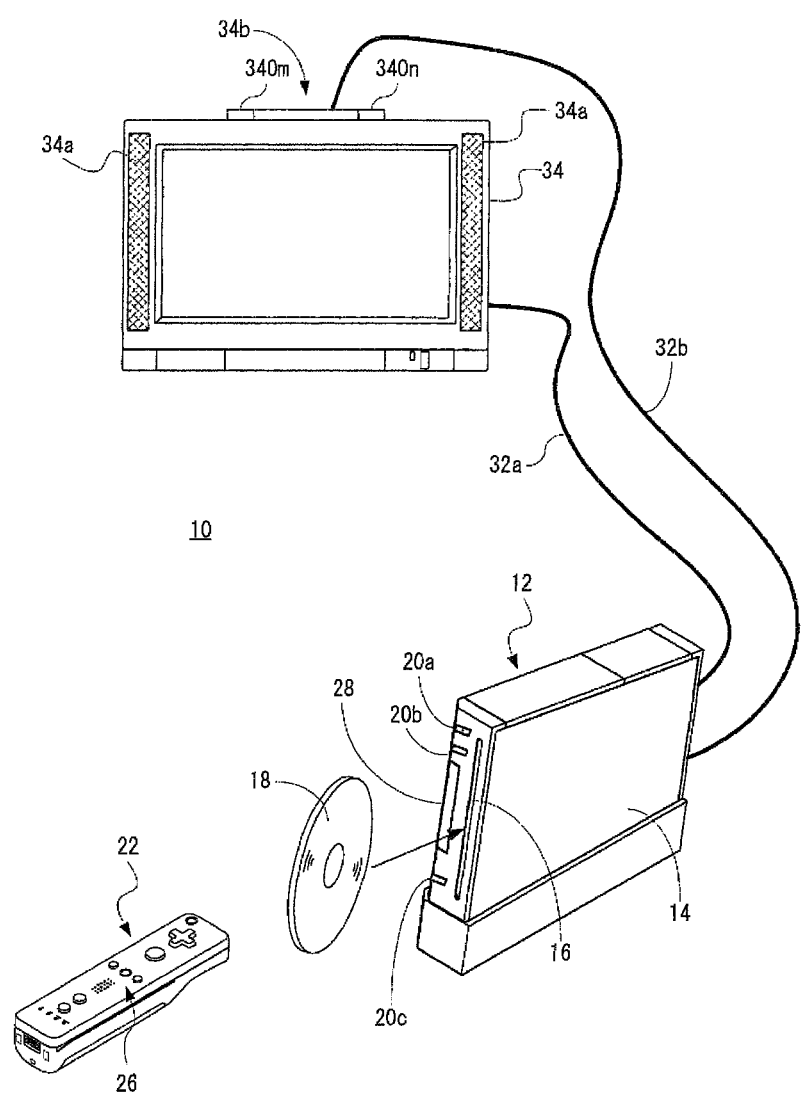
FIG. 1 is an illustrative view showing one embodiment of a game system according to the present invention.

Referring to FIG. 1, a game system 10 of one embodiment of the present invention includes a video game apparatus (hereinafter referred to as a "game apparatus") 12 functioning as an information processing apparatus and a controller 22. Although illustration is omitted, the game apparatus 12 of this embodiment is designed such that it can be connected to four controllers 22 at the maximum. Furthermore, the game apparatus 12 and the respective controllers 22 are connected by radio. The wireless communication is executed according to a Bluetooth (registered trademark) standard, for example, but may be executed by other standards such as infrared rays, a wireless LAN. In addition, it may be connected by a wire.

The game apparatus 12 includes a roughly rectangular parallelepiped housing 14, and the housing 14 is furnished with a disk slot 16 on a front surface. An optical disk 18 as one example of an information storage medium storing game program, etc. is inserted from the disk slot 16 to be loaded into a disk drive 54 (see FIG. 2) within the housing 14. Although illustration is omitted, around the disk slot 16, an LED and a light guide plate are arranged such that the LED of the disk slot 16 can light on or light on and off in accordance with various processing.

Furthermore, on the front surface of the housing 14 of the game apparatus 12, a power button 20a and a reset button 20b are provided at the upper part thereof, and an eject button 20c is provided below them. In addition, a connector cover for external memory card 28 is provided between the reset button 20*b* and the eject button 20*c*, and in the vicinity of the disk slot 16. Inside the connector cover for external memory card 28, an external connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory. In addition, in the game apparatus 12, other application except for the game may be executed, and in such a case, data of the other application can be stored in the memory card.

Here, a general-purpose SD card can be employed as a memory card, but other general-purpose memory cards, such as memory sticks, multimedia cards (registered trademark) can be employed.

Although omitted in FIG. 1, the game apparatus 12 has an AV cable connector 58 (FIG. 2) on the rear surface of the housing 14, and by utilizing the AV cable connector 58, a monitor 34 and a speaker 34*a* are connected to the game apparatus 12 through an AV cable 32*a*. The monitor 34 and the speaker 34*a* typically are a color television receiver, and through the AV cable 32*a*, a video signal from the game apparatus 12 is input to a video input terminal of the color television, and a sound signal is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34*a*. Around the monitor 34 (on the top side of the monitor 34, in this embodiment), a marker unit 34*b* including two infrared ray LEDs (markers) 340*m* and 340*n* is provided. The marker unit 34*b* is connected to the game apparatus 12 through a power source cable 32*b*. Accordingly, the marker unit 34*b* is supplied with power from the game apparatus 12. Thus, the markers 340*m* and 340*n* emit lights toward front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42(see FIG. 2)) of the game apparatus 12 so as to be executed from the internal memory. In such a case, programs stored in a storage medium like an optical disk 18 may be installed onto the internal memory, or the downloaded program may be installed onto the internal memory.

Figure 2:
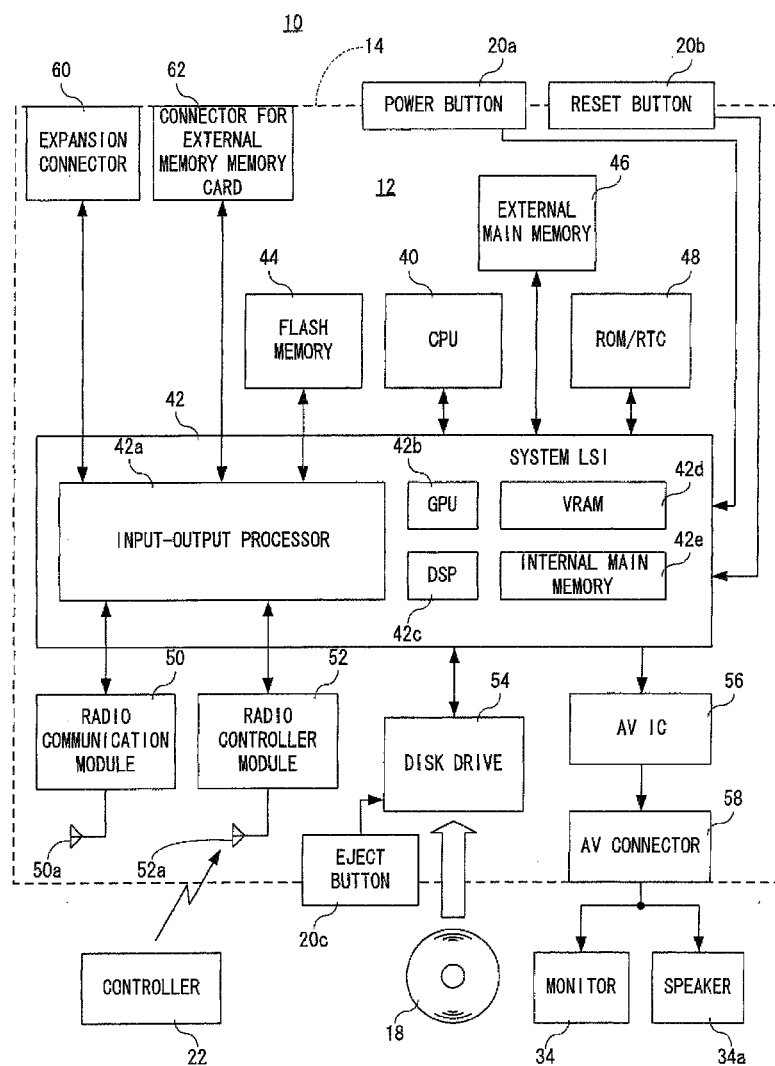
FIG. 2 is a block diagram showing an electrical configuration of the game system shown in FIG. 1.

FIG. 2 is a block diagram showing an electric configuration of the video game system 10 in FIG. 1 embodiment. Although illustration is omitted, the respective components within the housing 14 are contained on a printed board. As shown in FIG. 2, the game apparatus 12 has a CPU 40. The CPU 40 functions as a game processor. The CPU 40 is connected to a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc., various data. The ROM/RTC 48, the so-called boot ROM, is incorporated with a program for activating the game apparatus 12, and provided with a time circuit for counting a time. The disk drive 54 reads a program, image data, sound data, etc. from the optical disk 18, and writes them in an internal main memory 42*e* described later or the external main memory 46 under the control of the CPU 40.

The system LSI 42 is provided with an input-output processor 42*a*, a GPU (Graphics Processor Unit) 42*b*, a DSP (Digital Signal Processor) 42*c*, a VRAM 42*d* and an internal main memory 42*e*. These are connected with each other by internal buses although illustration is omitted. The input-output processor (I/O processor) 42*a* executes transmission and reception of data, downloads of data, and so forth. A detailed description is made later as to transmission and reception and download of the data.

The GPU 42*b* is made up of a part of a rendering means, and receives a graphics command (construction command) from the CPU 40 to generate game image data according to the command. Additionally, the CPU 40 applies an image generating program required for generating game image data to the GPU 42*b* in addition to the graphics command.

Although illustration is omitted, the GPU 42*b* is connected with the VRAM 42*d* as described above. The GPU 42*b* accesses the VRAM 42*d* to acquire the data (image data: data such as polygon data, texture data, etc.) required to execute the construction command. Additionally, the CPU 40 writes the image data required for drawing to the VRAM 42*d* via the GPU 42*b*. The GPU 42*b* accesses the VRAM 42*d* to create game image data for drawing.

In this embodiment, a description is made on a case that the GPU 42*b* generates game image data, but in a case of executing an arbitrary application except for the game application, the GPU 42*b* generates image data as to the arbitrary application.

Furthermore, the DSP 42*c* functions as an audio processor, and generates audio data corresponding to a sound, a voice, music, or the like by means of the sound data and the sound wave (tone) data stored in the internal main memory 42*e* and the external main memory 46.

The game image data and audio data generated as described above are read by the AV IC 56, and output to the monitor 34 and the speaker 34*a* via the AV connector 58. Accordingly, a game screen is displayed on the monitor 34, and a sound (music) necessary for the game is output from the speaker 34*a*.

Furthermore, the input-output processor 42*a* is connected with a flash memory 44, a radio communication module 50, a radio controller module 52, an expansion connector 60 and a connector for memory card 62. The radio communication module 50 is connected with an antenna 50a, and the radio controller module 52 is connected with an antenna 52a.

Although illustration is omitted, the input-output processor 42a can communicate with other game apparatuses and various servers to be connected to a network via the radio communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and, in a case that the transmission data is present, transmits it to the network via the radio communication module 50 and the antenna 50a. Furthermore, the input-output processor 42a receives data (referred to as reception data) transmitted from other game apparatuses via the network, the antenna 50a and the radio communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the radio communication module 50, and stores the download data in the flash memory 44.

Furthermore, the input-output processor 42a receives input data transmitted from the controller 22 via the antenna 52a and the radio controller module 52, and (temporarily) stores it in the buffer area of the internal main memory 42e or the external main memory 46. The input data is erased from the buffer area after being utilized in the processing by the CPU 40 (game processing, for example).

In this embodiment, as described above, the radio controller module 52 performs communication with the controller 22 in accordance with Bluetooth standards.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the radio communication module 50. The connector for memory card 62 can be connected with an external storage like a memory card. Thus, for example, the input-output processor 42a accesses the external storage via the expansion connector 60 and the connector for memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 set in a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the radio communication module 50, and the radio controller module 52. Accordingly, in this embodiment, in the standby mode, the CPU 40 never performs an application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the radio controller module 52a is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
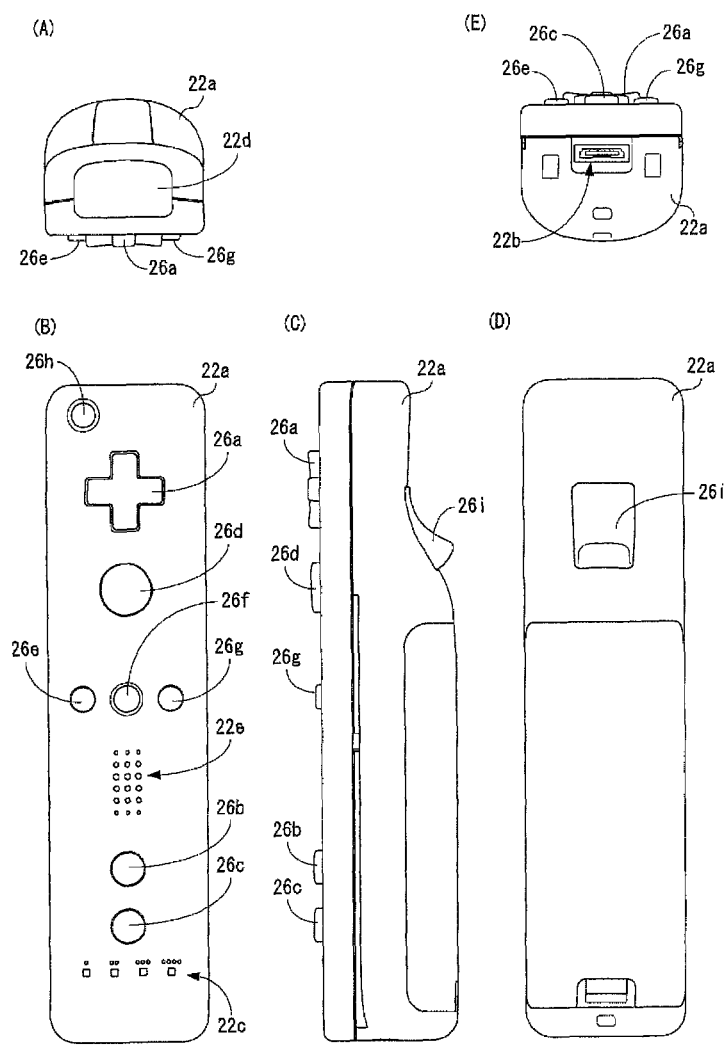
FIG. 3 is an illustrative view for explaining an external appearance of a controller shown in FIG. 1.

Each of FIG. 3(A) to FIG. 3(E) shows one example of an external appearance of the controller 22. FIG. 3(A) shows a front end surface of the controller 22, FIG. 3(B) shows a top surface of the controller 22, FIG. 3(C) shows a right side surface of the controller 22, FIG. 3(D) shows a lower surface of the controller 22, and FIG. 3(E) shows a back end surface of the controller 22.

Referring to FIG. 3(A) and FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on an upper surface of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or instruct the direction merely.

The 1 button 26b and the 2 button 26c are respectively push button switches, and are used for a game operation, such as adjusting a viewpoint position and a viewpoint direction on displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 22 is used as a pointing device, the A-button switch 26d is used to instruct a decision of an icon or a button image instructed by a pointer (instruction image) on the game screen. For example, when the icon or the button image is decided, an instruction or a command set in advance corresponding thereto can be input.

The – button 26e, the HOME button 26f, the + button 26g, and the power supply switch 26h are also push button switches. The – button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means. 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting, and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action and the command determined by the A-button 26d.

As shown in FIG. 3(E), an external expansion connector 22b is provided on a back end surface of the housing 22a, and as shown in FIG. 3(B), and an indicator 22c is provided on the top surface and on the side of the back end surface of the housing 22a. The external expansion connector 22b is utilized for connecting another expansion controller not shown other than the controller 22. The indicator 22c is made up of four LEDs, for example, and shows identification information (controller number) of the lighting controller 22 by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3(A), on the front end surface of the housing 22a, light incident opening 22d of the imaged information arithmetic section 80 is provided. Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3(B).

Note that as shown in FIG. 3(A) to FIG. 3(E), the shape of the controller 22 and the shape, number and setting position of each input means 26 are simply examples, and needless to say, even if they are suitably modified, the present invention can be realized.

Figure 4:
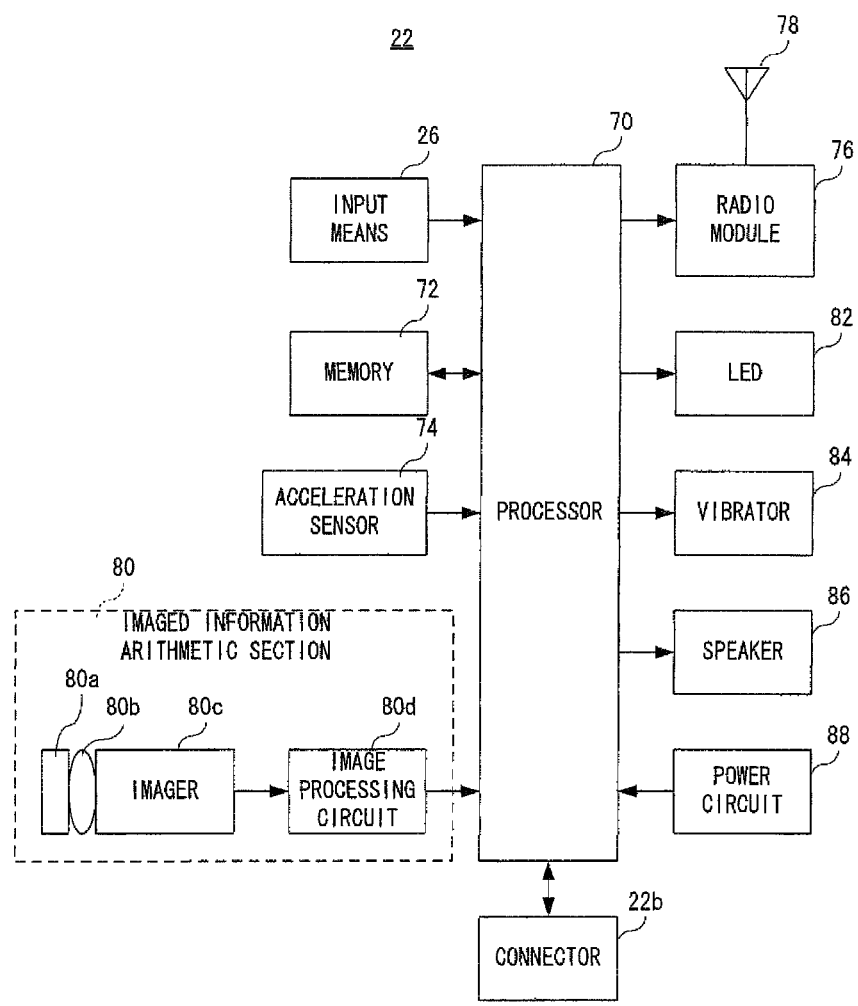
FIG. 4 is a block diagram showing an electrical configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), an vibrator 84, a speaker 86, and a power supply circuit 88 by an internal bus (not shown). Moreover, an antenna 78 is connected to the radio module 76.

For simplicity, although omitted in FIG. 4, the indicator 22c is made up of the four LEDs 82 as described above.

The processor 70 is in charge of an overall control of the controller 22, and transmits (inputs) information (input information) input by the input means 26, the acceleration sensor 74, and the imaged information arithmetic section 80 as input data to the game apparatus 12 via the radio module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once.

The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22a and in the vicinity of the circuit board where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application (game processing), following the acquired input data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80d is made later.

Figure 5:
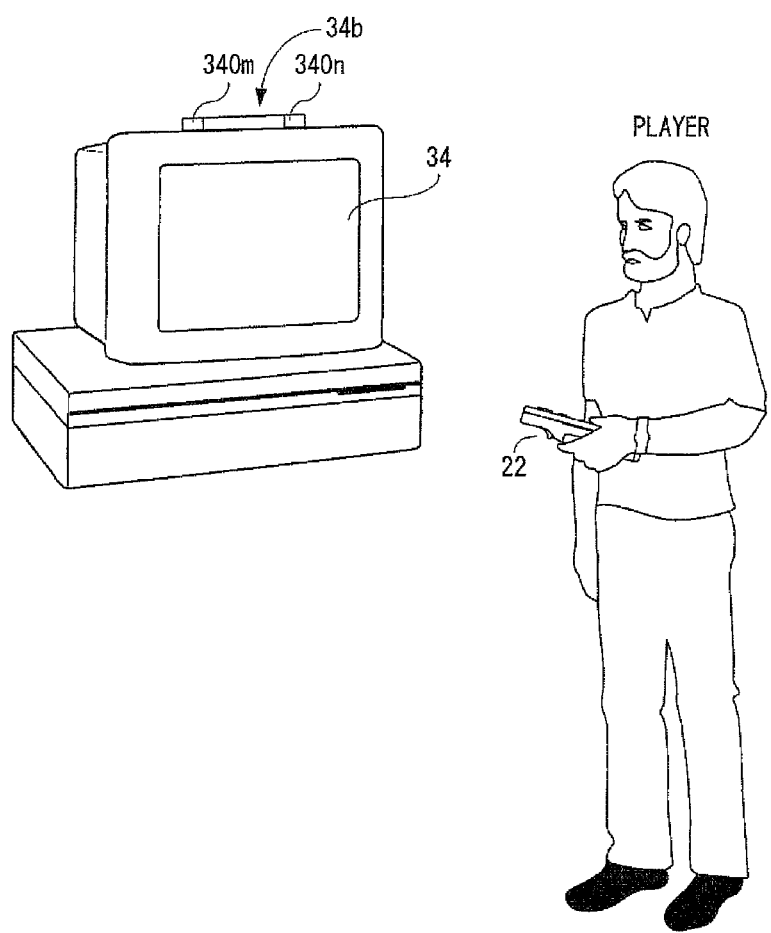
FIG. 5 is an illustrative view for schematically explaining how a virtual game is played using the controller shown in FIG. 1.

FIG. 5 is an illustrative view summarizing a state when a player plays a game by utilizing the controller 22. It should be noted that the same is true for a case that another application is executed as well as a game playing. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Figure 6:
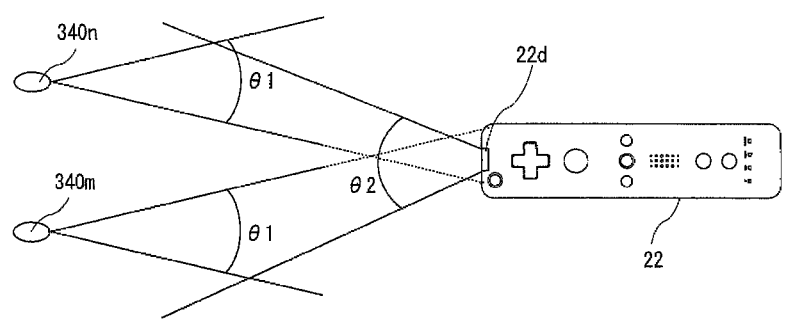
FIG. 6 is an illustrative view for explaining a view angle of a the controller and a marker shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range".

Figure 7:
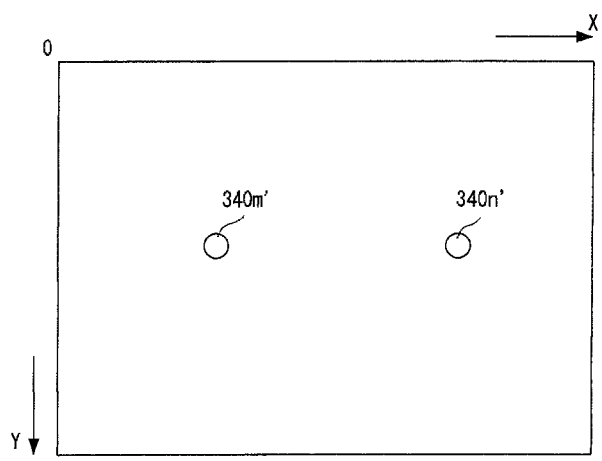
FIG. 7 is an illustrative view showing one example of a imaged image containing an object image.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is a view showing one example of the imaged image including an object image. The image processing circuit 80d calculates coordinates (marker coordinates) indicative of the position of each of the markers 340m and 340n in the imaged image by utilizing the image data of the imaged image including the object image.

Since the object image appears as a high-intensity part in the image data of the imaged image, the image processing circuit 80d first detects the high-intensity part as a candidate of the object image. Next, the image processing circuit 80d determines whether or not the high-intensity part is an object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is an object image is executed for discriminating the images 340m' and 340n' of the two markers 340m and 340n as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80d outputs data indicative of the calculated two marker coordinates. The data of the output marker coordinates (marker coordinate data) is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340m and 340n, and therefore, the game apparatus 12 can grasp the distance between the controller 22 and each of the markers 340*m* and 340*n* by calculating the distance between the two marker coordinates.

In the game system 10 as described above, when the game process is executed, although illustration is omitted, it is possible to play a virtual game in which objects are made to fight each other by alternately repeating offense turn and a defense turn between the player object and an enemy object in the battle scene. Alternatively, it is possible to play a virtual game in which operations are always carried out without setting the offense turn and the defense turn.

Figure 8:
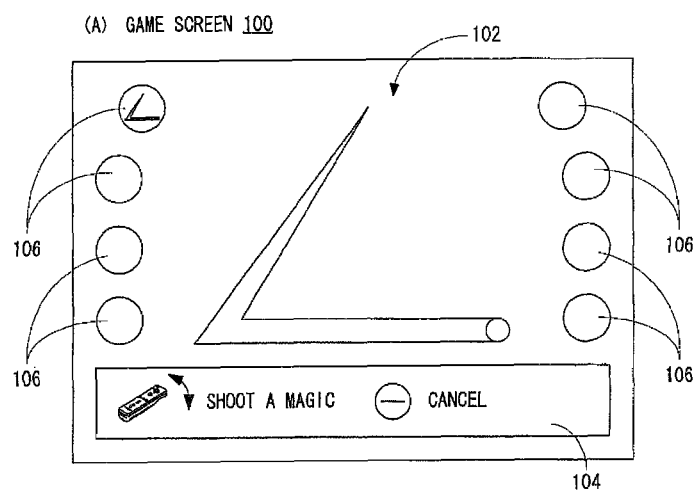
FIG. 8 is an illustrative view showing an example of a game screen displayed on a monitor shown in FIG. 1.
Figure 8:
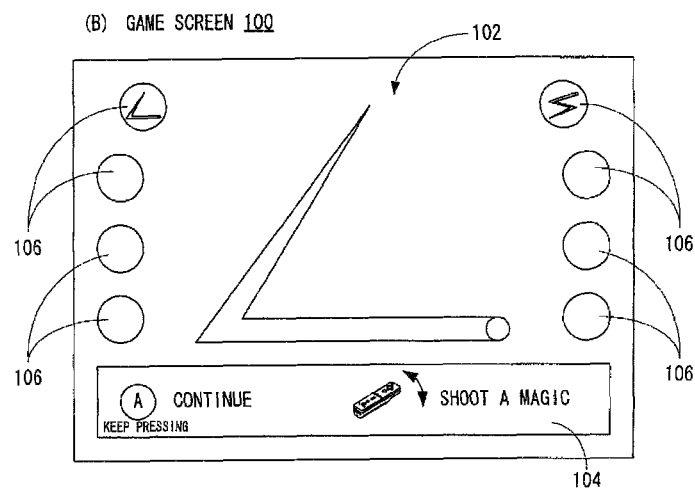

For example, in the battle scene, when the offense turn for the player object comes, game screens 100 as shown in FIG. 8(A) and FIG. 8(B) are displayed on the monitor 34. The game screens 100 are screens (operation screens) for instructing an attack that the player object is made to perform. As shown in FIG. 8(A) and FIG. 8(B), each game screen 100 is provided with a draw area 102 for drawing letters, pictorial figures, and symbols in the middle of the area (hereinafter referred to as "letters and such"). For the virtual game that is not turn-based, the operation screen can be displayed at a time when a specific operation is performed during the operation, for example. A display area 104 for displaying the operating instruction is provided below the draw area 102. Further, four display areas 106 for displaying the letters and such corresponding to available types of attack are provided on left and right sides of the draw area 102, respectively.

For example, when the game screen 100 is displayed on the monitor 34, the player refers to the letters and such displayed in the display area 106 and draws the letters and such that corresponds to a type of attach that is desired to make the player object to perform using the controller 22 in the draw area 102. As has been described, as the instruction position (instruction coordinates) on the screen of the monitor 34 can be specified by the controller 22, the drawing is carried out by moving the instruction position. Although illustration is omitted, an indication image is displayed at the position designated by the controller 22 in, the game screen 100, for example, and thus, the indication image is moved accordingly when the controller 22 is moved. Based on a trajectory of the indication image (a set of the coordinates of the instruction position aligned in chronological order), the letters and such drawn by the player are recognized.

It should be noted that, as a recognizing method of the letters and such drawn by the player, for example, a method described in Japanese Patent Laid-Open No. 2006-204344 that has been filed by the applicant of the present application and already published can be employed. The recognizing method of the letters and such is not essential to the present invention, and therefore an explanation for this method is not given.

When the letters and such drawn by the player are recognized, and match the letters and such described in the display area 106, the type of attack (for example, punch, kick, charge, slash with a sword and such, shoot a bullet, or a type of magic) assigned to the letters and such is determined. However, when the letters and such drawn by the player are recognized but do not match the letters and such described in the display area 106, it is judged that the drawing (input) is a failure. Further, a maximum length of time (for example, 30 seconds) for the player to draw the letters and such is set in advance, and it is also judged that the drawing is a failure when the letters and such are not recognized until the maximum length of time lapses after the game screen 100 is displayed on the monitor 34.

Here, in the display area 104 in the game screen 100 shown in FIG. 8(A), an image that indicates a motion of swinging the controller 22 is drawn as an operation procedure to "shoot a magic", and an image that indicates an operation of the − button 26*e* provided for the controller 22 is drawn as an operation procedure to "cancel" the inputted letters and such.

On the other hand, in the display area 104 in the game screen 100 shown in FIG. 8(B), an image and a text that indicate a motion of keeping pressing the A button 26*d* provided for the controller 22 is drawn (described) as an operation procedure to "continue" the attack (in this case, shoot a magic), and the image that indicates the motion of swinging the controller 22 is drawn as the operation procedure to "shoot a magic".

Specifically, in the game screen 100 shown in FIG. 8(B), instead of a basic operation (introductory operation) such as to "cancel", an explanation for a new operation (advanced operation) such as to continuously attack is displayed.

The content of the operating instruction to be displayed change in this manner, for example, when the player acquires an ability for a new operation (input), when the level (experience) of the player object increases, and when the player's level of the operation (operation level) increases as the virtual game is progressed. In other words, the contents to be displayed are changed (determined) according to the progress of the virtual game.

However, in this embodiment, when the virtual game has not been played for a relatively long period of time (for example, a week or longer), the operating instruction is displayed regardless of the progress of the game. This is because there are cases that the player has possibly forgotten how to operate (how to input). In other words, the contents to be displayed may be changed according to the player's condition.

Figure 9:
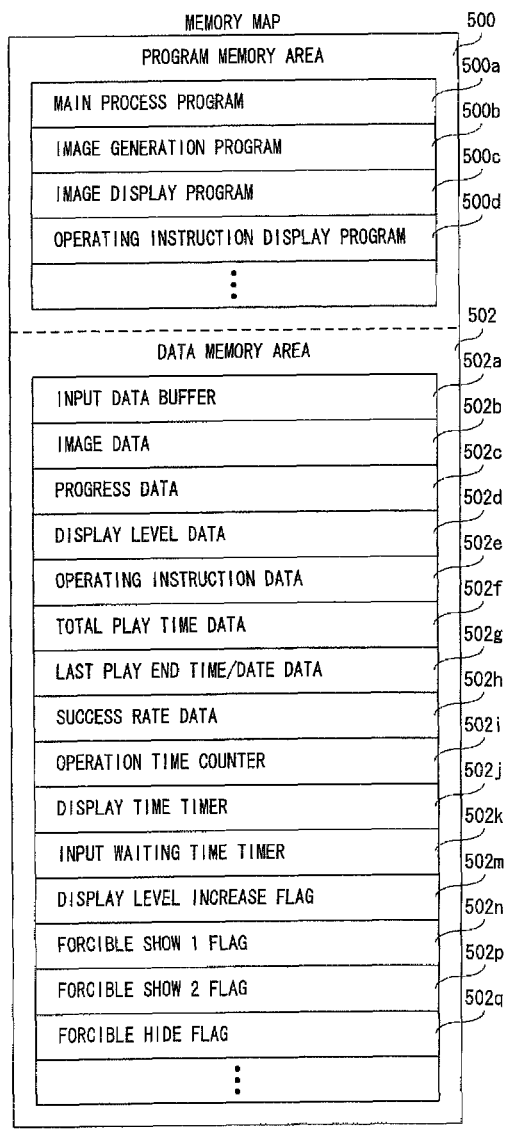
FIG. 9 is an illustrative view showing one example of a memory map of a main memory shown in FIG. 2.

FIG. 9 shows one example of a memory map of the main memory (42*e*, 46) shown in FIG. 2. As shown in FIG. 9, the main memory (42*e*, 46) includes a program memory area 500 and a data memory area 502. The program memory area 500 stores a game program, and the game program is configured by a main process program 500*a*, an image generation program 500*b*, an image display program 500*c*, an operating instruction display program 500*d*, and such.

Figure 11:
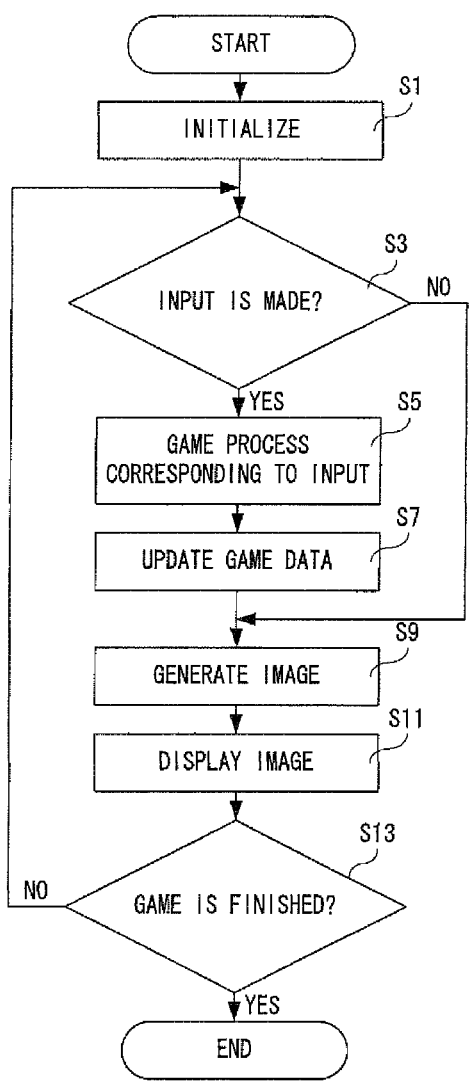
FIG. 11 is a flowchart showing an entire process of a CPU shown in FIG. 2.

The main process program 500*a* is a program for processing a main routine of the virtual game of this embodiment (see FIG. 11). The image generation program 500*b* is a program for generating game image data that corresponds to the game screen (100 and such) displayed on the monitor 34 using an image data 502*b* that is later described. The image display program 500*c* is a program for outputting the game image data generated according to the image generation program 500*b* to the monitor 34 and displaying the corresponding game screen (100 and such). The operating instruction display program 500*d* is a program for controlling the display of the operating instruction in the display area 104 in the game screen 100 (see FIG. 12 to FIG. 16).

Although illustration is omitted, the game program includes such as an audio output program and a backup program. The audio output program is a program for generating sound needed for the game, such as voices or imitative voices of the player object and the enemy objects, sound effects, and music (BGM), and outputting the generated sound through the speaker 34*a*. The backup program is a program for saving the game data (502*c*, 502*d*, 502*f*, 502*g*, and such) stored in the data memory area 502, the flash memory 44, or an external memory card.

The data memory area 502 is provided with an input data buffer 502*a*. Further, the image data 502*b*, a progress data 502*c*, a display level data 502*d*, an operating instruction data 502*e*, a total play time data 502*f*, a last play end time/date data 502*g*, and a success rate data 502*h* are stored in the data memory area 502. Moreover, an operation time counter 502*i*, a display time timer 502*j*, an operation waiting time timer 502*k*, a display level increase flag 502*m*, a forcible show 1 flag 502*n*, a forcible show 2 flag 502*p*, and a forcible hide flag 502*q* are provided for the data memory area 502.

The input data buffer 502*a* stores input data from the controller 22 according to the chronological order (temporary memory). The input data stored in the input data buffer 502*a* is deleted (cleared) after used in the game process.

As described above, the image data 502*b* is polygon data or textural data for generating the game image data. The progress data 502*c* is data regarding the progress of the virtual game. Here, in this embodiment, the progress of the virtual game means information regarding a stage (or phase, or chapter) that the player has cleared, information of types of attach (such as magic) that the player object has learned, information of items that the player object owns, information of the level (experience) of the player object and such.

The display level data 502*d* is numeric data regarding display levels of the operating instructions. The operating instruction data 502*e* is data regarding specific contents of the operating instructions. For example, as shown in FIG. 10, the operating instruction data 502*e* is data of a table in which the contents of the operating instructions corresponding to the display levels are described. As shown in FIG. 10, in this embodiment, the display levels are set as 1, 2, 3, 4, 5, . . . , and n, and an operating instruction (1), an operating instruction (2), an operating instruction (3), an operating instruction (4), an operating instruction (5), . . . , and an operating instruction (n) are described respectively corresponding to display levels 1-*n*. However, the operating instructions (1) to (n) are actually the data regarding the images and text as shown in FIG. 8(A) and FIG. 8(B). Further, although a detailed explanation is not given, as the display level increases, the content of the operating instruction become advanced.

Referring again to FIG. 9, the total play time data 502*f* is data regarding total time period for which the virtual game has been played. Although a detailed explanation is not given, every time the virtual game is played, starting date and time and ending date and time of the play are obtained from the ROM/RTC 48, and a play time period is calculated based on a difference between these date and time, and the play time period is added to the total play time when the play ends. The last play end time/date data 502*g* is data regarding the date and time when the last play of the virtual game has ended. As described above, the ending date and time of the play is obtained from the ROM/RTC 48.

The success rate data 502*h* is numeric data regarding a success rate of an input of the letters and such, that is, an operation, by the player. In this embodiment, the success rate is a value obtained by dividing a number of the correct operations in the same display level by a number of the all operations (a total number of times of operation). Therefore, when the display level is updated (increased, in this embodiment), the success rate is reset.

The operation time counter 502*i* is an up counter for counting a number of a predetermined operation. The predetermined operation is an operation that is explained for the first time in the operating instruction of the current display level (new operation, in this embodiment). The display time timer 502*j* is a timer for counting a time period during which the operating instruction is displayed. Further, the operation waiting time timer 502*k* is a timer for counting a time period of waiting for an input (operation) by the player.

The display level increase flag 502*m* is a flag for judging whether or not the display level of the operating instruction has been increased, and configured by a single-bit register. When the display level increase flag 502*m* is on, the register is set with a data value "1". On the other hand, when the display level increase flag 502*m* is off, the register is set with a data value "0". In this embodiment, when the display level is increased, the display level increase flag 502*m* is made on. Further, when the number of the predetermined operation reaches a given number of times or more, in other words, when a count value of the operation time counter 502*i* reaches a given value or more, the display level increase flag 502*m* is made off.

The forcible show 1 flag 502*n* is a flag for judging whether or not, when a given period of time (for example, a week) or longer has lapsed since the last play, the operating instruction is set to be forcibly shown, and configured by a single-bit register. When the forcible show 1 flag 502*n* is on, the register is set with a data value "1". On the other hand, when the forcible show 1 flag 502*n* is off, the register is set with a data value "0". In this embodiment, when the given period of time or longer has lapsed since the last play, and when the operating instruction is set to be forcibly shown regardless of the game level, the forcible show 1 flag 502*n* is made on. Further, when the virtual game is started, the forcible show 1 flag 502*n* is made off.

The forcible show 2 flag 502*p* is a flag for judging whether or not the operating instruction is set to be forcibly shown when there is no operation (input) for a given period of time (in this embodiment, 10 seconds) or longer since the game screen 100 (operation screen) has been displayed, and configured by a single-bit register. When the forcible show 2 flag 502*p* is made on, the register is set with a data value "1". On the other hand, when the forcible show 2 flag 502*p* is off, the register is set with a data value "0". In this embodiment, when the player inputs the letters and such, and when there is no input for the given period of time (for example, 10 seconds) or longer since the operation screen was displayed, the forcible show 2 flag 502*p* is made on. Further, by making the forcible show 2 flag 502*p* on, when the given period of time (for example, 2 seconds) has lapsed since the operating instruction is forcibly displayed, the forcible show 2 flag 502*p* is made off.

The forcible hide flag 502*q* is a flag for judging whether or not the operating instruction is forcibly hidden, and configured by a single-bit register. When the forcible hide flag 502*q* is on, the register is set with a data value "1". On the other hand, when the forcible hide flag 502*q* is off, the register is set with a data value "0". In this embodiment, when the number of the predetermined operation reaches the given number of times, or when the given period of time (for example, 2 seconds) has lapsed since the operating instruction is forcibly shown, the forcible hide flag 502*q* is made on. Further, when it is set to display the operating instruction, the forcible hide flag 502*q* is made off.

Although illustration is omitted, other data such as sound data is also stored in the data memory area 502. In addition, other counters (timers) and other flags necessary for the game process are set.

FIG. 11 is a flowchart showing an entire process of the CPU 40 shown in FIG. 2. As shown in FIG. 11, when the CPU 40 starts the entire process, the CPU 40 executes an initialization process in a step S1. Here, the CPU 40 clears the input data buffer 502*a*, loads the each of pieces of data 502*b* to 502*h*, resets the counter 502*i* or the timers 502*j* and 502*k*, or makes the flags 502*m* to 502*q* off.

In a subsequent step S3, it is determined whether there is an input or not. Here, whether the input data for a current frame is stored in the input data buffer 502*a* or not is determined. If "NO" in the step S3, that is, there is no input, the process directly proceeds to a step S9. On the other hand, If "YES" in the step S3, that is, there is an input, the game process corresponding to the input is executed in a step S5, the game data is updated in a step S7, and then the process proceeds to the step S9.

Although a detailed explanation is not given, in the game process of the step S5, according to the input (operation) by the player, a position of the player object in a three-dimensional virtual space is updated, the player object is caused to carry out an arbitrary action, or the recognition process of the letters and such is performed when the player has inputted the letters and such. Further, in the game process, according to the game program, a position a non-player object such as an enemy object is updated, or the non-player object is caused to carry out an arbitrary action, without depending on the player's operation.

Further, in the step S7, by executing the game process in the step S5, the progress data 502c and the display level data 502d included in the game data are updated as needed.

In the step S9, an image generation process is executed. Specifically, the CPU 40 generates the game image data for displaying the game screen (such as 100). Although not shown in the drawing, when displaying the game screen 100 (operation screen) as shown in FIG. 8(A) or FIG. 8(B), the operating instructions are shown or hidden according to the show/hide setting of the operating instructions in the control process of displaying the operating instruction (see FIG. 12 to FIG. 16) as described later.

Although illustration is omitted, as the display area 104 is not displayed in the game screen 100 when the operating instruction is hidden, it is possible to make the draw area 102 larger. In other words, the display area of the monitor 34 can be effectively used.

In a subsequent step S11, the image display process is executed. Specifically, the CPU 40 outputs the game image data generated in the step S9 to the monitor 34. In a subsequent step S13, whether the game has been finished or not is determined. Specifically, the CPU 40 determines if the virtual game has been determined to be finished due to game clear or game over, or if the virtual game has been determined to be finished according to the player's instruction.

If "NO" in the step S13, that is, if the game has not been finished, the process directly returns to the step S3. On the other hand, If "YES" in the step S13, that is, if the game has been finished, the entire process is terminated.

It should be noted that, although illustration is omitted, when an event such as the player's instruction or when the game finish occurs, the game data (502c, 502d, 502f, 502g, and such) is stored (saved) in the flash memory 44 or the memory card. At this time, the total play time data 502f and the last play end time/date data 502g are updated.

FIG. 12 to FIG. 16 are flowcharts showing the control process of displaying the operating instruction. The control process of displaying the operating instruction is started at timing when the operating instruction is displayed. However, in the virtual game of this embodiment, the timing when the operating instruction is displayed means when the offense turn for the player object comes. However, the timing when the operating instruction is displayed is not necessarily limited to such an example, and, in a different virtual game, can be timing of the level-up of the player object (learning of a predetermined skill or an increase of the experience), when a new operation becomes available by obtaining a predetermined item, or simply when there is no player input for the given period of time.

Figure 12:
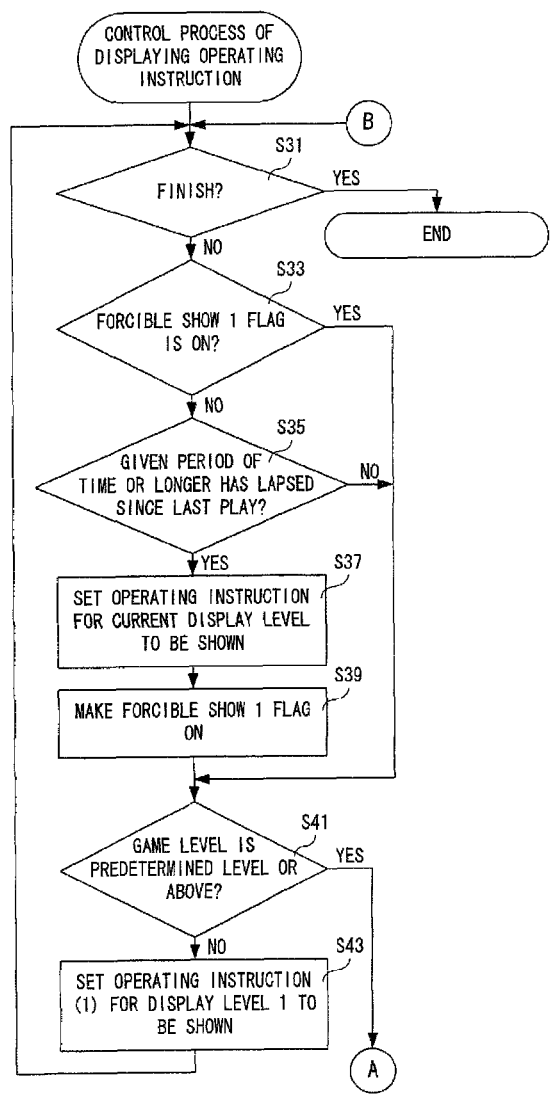
FIG. 12 is a flowchart showing a part of a control process of displaying an operating instruction of the CPU shown in FIG. 2.

As shown in FIG. 12, when the CPU 40 starts the control process of displaying the operating instruction, the CPU 40 determines whether or not to finish in a step S31. In other words, the CPU 40 determines whether or not to finish the display control of the operating instruction. In this embodiment, it is determined to finish the display control of the operating instruction when the player inputs the letters and such to erase the game screen 100 shown in FIG. 8(A) or FIG. 8(B), that is, when the game screen 100 is updated to a different game screen (in this embodiment, mainly the game screen of the attack scene of the player object).

If "YES" in the step S31, that is, if determined to finish, the control process of displaying the operating instruction is finished. On the other hand, if "NO" in the step S31, that is, if determined not to finish, it is determined if the forcible show 1 flag 502n is on in a step S33. In other words, the CPU 40 determines whether the given period of time or longer has lapsed since the last play, and whether the operating instruction is set to be forcibly shown.

If "YES" in the step S33, that is, if the forcible show 1 flag 502n is on, the process directly proceeds to a step S41. On the other hand, if "NO" in the step S33, that is, if the forcible show 1 flag 502n is off, it is determined whether or not the given period of time or longer has lapsed since the last play in a step S35. In other words, the CPU 40 compares the last play finish time and date indicated by the last play end time/date data 502g with the current time and date, and determines whether or not the given period of time (for example, a week) or longer has lapsed. However, the CPU 40 obtains the current time and date from the ROM/RTC 48, similarly to the play start time and date and the play finish time and date.

If "NO" in the step S35, that is, if the given period of time or longer has not lapsed since the last play, the process directly proceeds to the step S41. On the other hand, if "YES" in the step S35, that is, if the given period of time or longer has lapsed since the last play, the operating instruction for the current display level is set to be shown in a step S37, the forcible show 1 flag 502n is made on in a step S39, and then the process proceeds to a step S45. However, in the step S37, the CPU 40 sets to show the content of the operating instruction corresponding to the display level indicated by the display level data 502d. The same applies to the following.

It should be noted that, while the operating instruction is set to be shown when it has not played for a certain length of time period regardless of the game level in this embodiment, it is possible to set the operating instruction to be shown by decreasing the display level, for example. This is because, in such a case, it is considered that a detrimental effect in the play can be prevented from occurring even if the player's operation level has been decreased. It is considered that the degree of decrease in the display level can be determined in a stepwise manner based on the length of the time period that has lapsed since the last play, for example.

Referring again to FIG. 12, in the step S41, it is determined whether or not the game level is a predetermined level or above. In this embodiment, the CPU 40 determines whether or not the game level is the predetermined level or above based on the game progress (a number of cleared stages, chapters, or phases) indicated by the progress data 502c. For example, when even a single stage has not been cleared yet (when playing the first stage, first chapter, or first phase), it is determined that the game level is under the predetermined level, and when one or more stages have been cleared, it is determined that the game level is the predetermined level or above. Alternatively, it is possible to determine whether or not the game level is the predetermined level or above based on the total play time of the virtual game indicated by the total play time data 502*f*. For example, it is determined that the game level is under the predetermined level when the total play time is shorter than the given period of time (2 hours), and it is determined that the game level is the predetermined level or above when the total play time is the given period of time or longer. Alternatively, it is possible to determine the game level considering both the number of the cleared stages and the total play time.

If "NO" in the step S41, that is, if the game level is under the predetermined level, in a step S43, the operating instruction (1) for the display level 1 (basic level) is set to be shown, and the process returns to the step S31. On the other hand, if "YES" in the step S41, that is, if the game level is the predetermined level or above, the process directly proceeds to the step S45 shown in FIG. 13.

Figure 13:
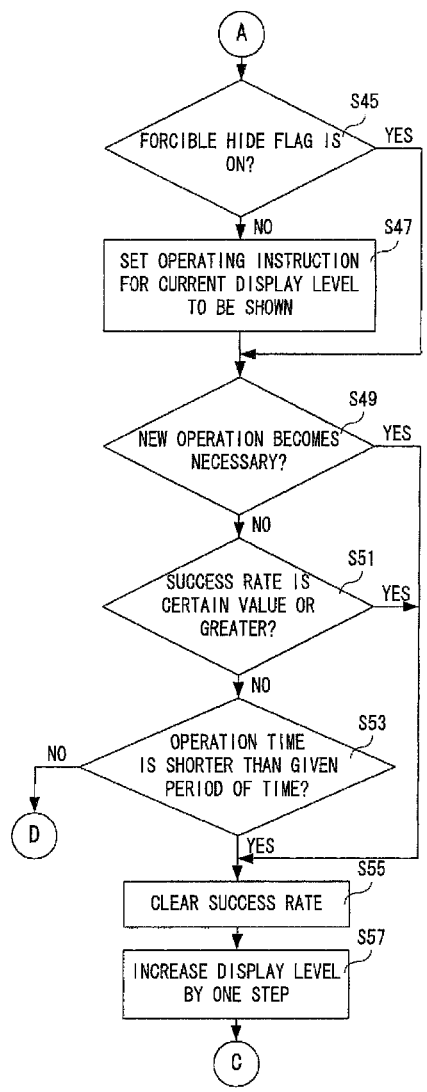
FIG. 13 is a flowchart showing a second part of the control process of displaying the operating instruction of the CPU shown in FIG. 2 that follows the process shown in FIG. 12.
Figure 14:
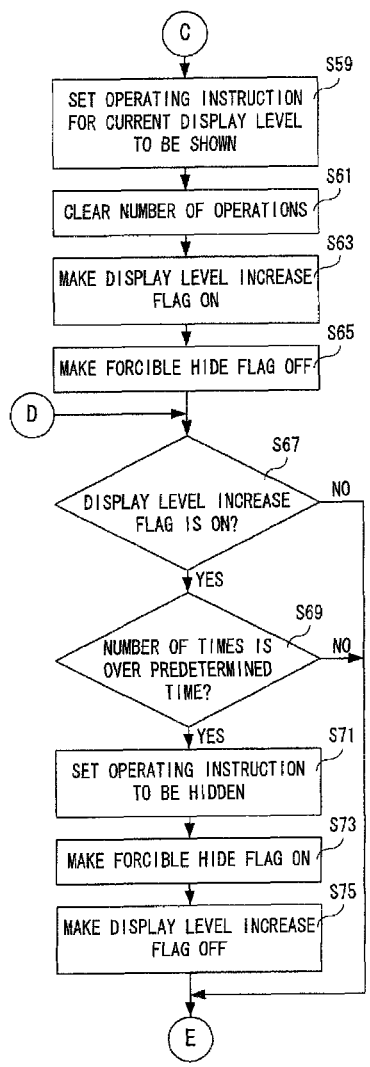
FIG. 14 is a flowchart showing a third part of the control process of displaying the operating instruction of the CPU shown in FIG. 2 that follows the process shown in FIG. 13.

In the step S45 shown in FIG. 13, it is determined whether or not the forcible hide flag 502*q* is on. If "YES" in the step S45, that is, if the forcible hide flag 502*q* is on, the process directly proceeds to a step S49. On the other hand, if "NO" in the step S45, that is, if the forcible hide flag 502*q* is off, the operating instruction for the current display level is set to be shown in a step S47, and then the process proceeds to the step S49.

In the step S49, it is determined if the new operation becomes necessary. Here, the CPU 40 determines whether or not a continuous attack or a special attack has been learned referring to the progress of the game (here, the types of attack that the player object has learned) indicated by the progress data 502*c*. In other words, the CPU 40 determines whether or not the new operation such as the continuous operation or the operation that is carried out in combination has become necessary.

If "YES" in the step S49, that is, if the new operation has become necessary, the process directly proceeds to a step S55. On the other hand, if "NO" in the step S49, that is, if the new operation has not become necessary, it is determined whether or not the success rate is a certain value or greater in a step S51. If "YES" in the step S51, that is, if the success rate is the certain value or greater, the process proceeds to the step S55. On the other hand, if "NO" in the step S51, that is, if the success rate smaller than the certain value, it is determined whether or not operation time is shorter than the given period of time in a step S53. If "NO" in the step S53, that is, if the operation time is the given period of time or longer, the process directly proceeds to a step S67 shown in FIG. 14. On the other hand, if "YES" in the step S53, that is, if the operation time is shorter than the given period of time, the process proceeds to the step S55.

It should be noted that, in this embodiment, a degree of the player's proficiency in operation (operation level) is detected by carrying out the determination process such as the step S51 or the step S53. In this embodiment, the degree of the player's proficiency in operation is determined to be high, when one of the conditions of the success rate being the certain value or greater or the operation time being shorter than the given period of time is satisfied. However, it is possible to determine that the degree of the player's proficiency in operation is high when both of these conditions are satisfied.

Further, while, in this embodiment, it is determined whether or not the success rate is the certain value or greater in the step S51 regardless of the total number of times of operation, the process of the step S51 is carried out when the total number of operations is a certain value (for example, 20) or greater in practice, because carrying out a correct operation when the total number of times of operation is small makes the success rate higher.

Referring again to FIG. 13, in the step S55, the success rate is cleared. In other words, the CPU 40 resets the success rate data 502*h*. In a step S57, the display level is increased by one step. In other words, the CPU 40 increases the display level indicated by the display level data 502*d* by one step, and updates the display level data 502*d*. Then, in a step S59 shown in FIG. 14, the operating instruction for the current display level is set to be shown, and a number of times of operation is reset in a step S61. In other words, the count value of the operation time counter 502*i* is set to be 0. In a subsequent step S63, the display level increase flag 502*m* is made on, the forcible hide flag 502*q* is made off in a step S65, and the process proceeds to the step S67.

In the step S67, it is determined whether or not the display level increase flag 502*m* is on. Here, the CPU 40 determines whether or not it has not been long since the display level becomes the current display level. This is for displaying the operating instruction corresponding to the display level after the change until the player is used to the new operation procedure after the display level changes. If "NO" in the step S67, that is, if the display level increase flag 502*m* is off, the process directly proceeds to a step S77 shown in FIG. 15. On the other hand, if "YES" in the step S67, that is, if the display level increase flag 502*m* is on, it is determined whether or not the number of times of operation is over the predetermined time in a step S69. Here, the CPU 40 determines whether or not the count value of the operation time counter 502*i* is over a certain value (for example, 20).

If "NO" in the step S69, that is, if the number of times of operation is under the predetermined number of times, it is determined that the player is not used to the new operation procedure, and the process directly proceeds to the step S77. On the other hand, if "YES" in the step S69, that is, if the number of times of operation is over the predetermined number of times, it is determined that the player is used to the new operation procedure, and the operating instruction is set to be hidden in a step S71, the forcible hide flag 502*q* is made on in a step S73, the display level increase flag 502*m* is made off in a step S75, and then the process proceeds to the step S77.

Figure 15:
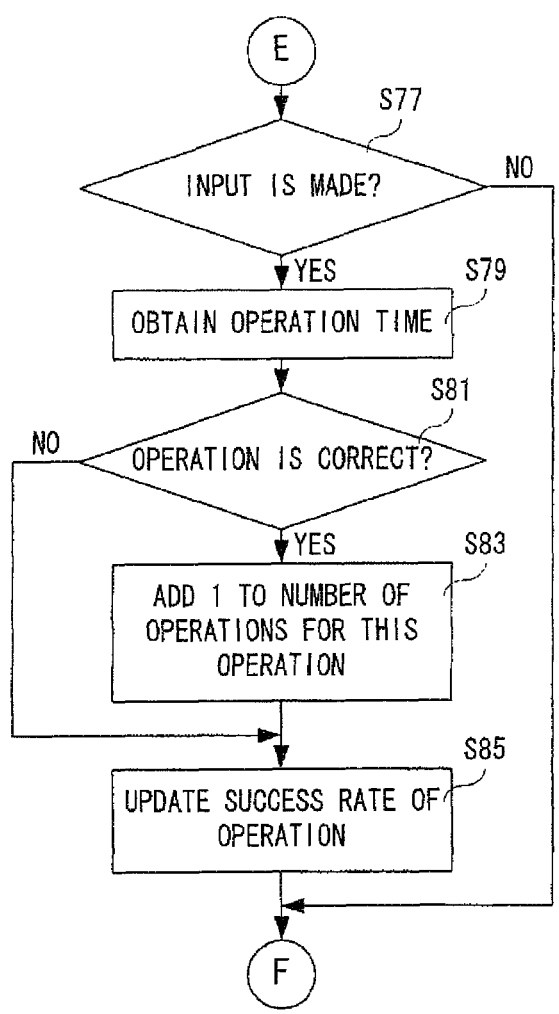
FIG. 15 is a flowchart showing a fourth part of the control process of displaying the operating instruction of the CPU shown in FIG. 2 that follows the process shown in FIG. 14.

As shown in FIG. 15, in the step S77, it is determined whether or not there is an input. This determination process is the same as the process carried out in the step S3 as described above. If "NO" in the step S77, that is, if there is no input, the process directly proceeds to a step S87 shown in FIG. 16. On the other hand, if "YES" in the step S77, that is, if there is an input, the operation time is obtained in a step S79. Although a detailed explanation is not given, when the CPU 40 displays the game screen 100 (operation screen) as shown in FIG. 8(A) and FIG. 8(B), the CPU 40 starts the input waiting time timer 502*k*, and when there is an input, that is, if "YES" in the step S77, the input waiting time timer 502*k* is stopped and a time period during which there is no input, i.e. operation time (a period of time taken for the operation) is measured. While, in this embodiment, the time period from the operation screen is displayed until an input is started is obtained as the operation time, the time period from the operation screen is displayed until an input is finished (the letters and such are recognized) can be obtained as the operation time. In such a case, the input waiting time timer 502*k* is stopped when the letters and such are recognized.

In a subsequent a step S81, it is determined whether or not the operation is correct. Specifically, the CPU 40 determines whether or not the letters and such inputted by the player, that is, the recognized letters and such match the letters and such displayed in the display area 106. If "NO" in the step S81, that is, if the operation is not correct, the process directly proceeds to the step S85. On the other hand, if "YES" in the step S81, that is, if the operation is correct, a number of times of operation for the operation of this time is added by 1 in a step S83, and the process proceeds to the step S85. In other words, in the step S83, the CPU 40 adds 1 to the count value of the operation time counter 502i.

In the step S85, the success rate of the operation is updated, and the process proceeds to the step S87. In the step S85, the CPU 40 adds 1 to the total number of times of operation. Then, the CPU 40 calculates the success rate by dividing the number of times of the correct operations (the count value of the operation time counter 502i) by the total number of times of operation. However, if it is determined to be "NO" in the step S81, the number of times of the correct operations is not added.

Figure 16:
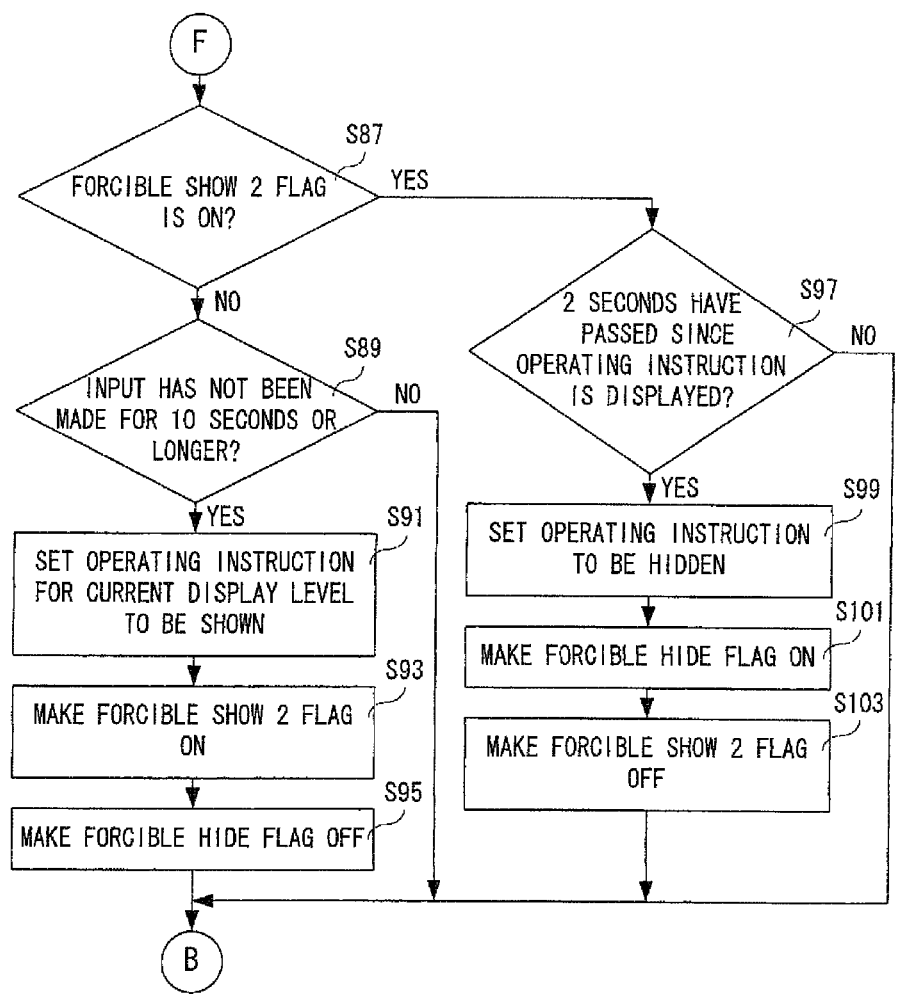
FIG. 16 is a flowchart showing a fifth part of the control process of displaying the operating instruction of the CPU shown in FIG. 2 that follows the process shown in FIG. 15.

As shown in FIG. 16, in the step S87, it is determined whether or not the forcible show 2 flag 502p is on. If "NO" in the step S87, that is, if the forcible show 2 flag 502p is off, it is determined whether or not an input has not been made for 10 seconds or longer in a step S89. Specifically, the CPU 40 determines whether or not the count value of the input waiting time timer 502k is 10 seconds or longer. If "NO" in the step S89, that is, if the time period during which no input has been made is shorter than 10 seconds, the process directly returns to the step S31 shown in FIG. 12. On the other hand, if "YES" in the step S89, that is, if no input has been made for 10 seconds or longer, the operating instruction for the current display level is set to be shown in a step S91, the forcible show 2 flag 502p is made on in a step S93, the forcible hide flag 502q is made off in a step S95, and then the process returns to the step S31.

Further, if "YES" in the step S87, that is, if the forcible show 2 flag 502p is on, it is determined whether or not 2 seconds have passed since the operating instruction is displayed in a step S97. Although a detailed explanation is not given, when the operating instruction is displayed in the game screen 100 (explanation screen) according to the entire process after it is determined to be "YES" in the step S89, the display time timer 502j is started. In the step S97, it is determined whether or not a count value of the display time timer 502j is over 2 seconds.

If "NO" in the step S97, that is, if 2 seconds has not passed since the operating instruction is displayed, the process directly returns to the step S31. On the other hand, if "YES" in the step S97, that is, if 2 seconds has passed since the operating instruction is displayed, the operating instruction is set to be hidden in a step S99, the forcible hide flag 502q is made on in a step S101, the forcible show 2 flag 502p is made off in a S103, and then the process returns to the step S31.

According to this embodiment, as the operating instructions of different contents are displayed at least according to the progress of the game, the operating instruction that is necessary can be presented when needed.

It should be noted, while, in this embodiment, the display level is increased when the success rate of the operation is the certain value or greater, the display level can be decreased when the success rate of the operation is low. Alternatively, the display level can be decreased when the operation is not correct.

Further, while, in this embodiment, as the operating instruction is forcibly shown when there is no input over the given period of time in the case in which the operating instruction is hidden, the operating instruction can be set to be forcibly shown when highly advanced operating instructions are displayed. For example, the highly advanced operating instruction represents the operating instruction regarding the content that is essential for the progress of the game, for example, including the operating instruction necessary to clear the stage that is being played or the operating instruction necessary to defeat the boss of the enemy object.

Further, while the operation level is judged based on the operation time or the success rate in this embodiment, it is not necessary to limit to these examples. For example, the operation level can be judged based on an aesthetic feature of the letters and such drawn by the player. Further, the operation level can be judged based on all of these elements.

Moreover, while this embodiment explains only about the game system provided with the game apparatus and the monitor separately, it is possible to apply for a game apparatus integrally provided with a monitor, for example, such as a portable game apparatus, a computer (including a PDA) having a game function, and a portable phone having a game function, and an arcade game machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program for a game apparatus that is provided with an operating instruction data storage device for storing operating instruction data for displaying an operating instruction for a virtual game on a display device, and that outputs a game screen of said virtual game to said display device,
said game program makes a computer of said game apparatus to perform functionality comprising:
  storing game data including at least data relating to progress of said virtual game in a storage medium;
  determining whether or not it is time to display said operating instruction on said display device;
  determining, when it is determined to be the time to display said operating instruction, whether or not to display said operating instruction based on the game data stored in said game data storage medium; and
  outputting, when it is determined to display said operating instruction, the operating instruction data corresponding to the operating instruction to said display device,
  wherein when a time period from a last play to a current play of said virtual game is over a predetermined time period, said operating instruction is displayed regardless of the game data stored in said game data storage device.

2. The non-transitory storage medium storing a game program according to claim 1, wherein
said progress of the virtual game includes a number of game stages that have been cleared.

3. The non-transitory storage medium storing a game program according to claim 1, wherein
said progress of the virtual game includes total play time of said virtual game.

4. The non-transitory storage medium storing a game program according to claim 1, wherein
a plurality of contents for a single type of operating instruction that are different according to an operation level of a player are stored,
said game program further makes said computer perform functionality comprising detecting an operation by said player, and determining the operation level of said player based on the detected operation, and
outputting the operating instruction data for said operating instruction of a content according to the determined operation level.

5. The non-transitory storage medium storing a game program according to claim 4, wherein
said operation level is a success rate of said operation.

6. The non-transitory storage medium storing a game program according to claim 4, wherein
said operation level is a time period taken for said operation.

7. The non-transitory storage medium storing a game program according to claim 1, wherein
when a new type of operation becomes available in said virtual game, said game program determines that it is time to display an operating instruction for the new operation on said display device.

8. A non-transitory storage medium storing a game program for a game apparatus that is provided with an operating instruction data storage device for storing operating instruction data for displaying an operating instruction for a virtual game on a display device, and that outputs a game screen of said virtual game to said display device, said game program makes a computer of said game apparatus to perform functionality comprising:
storing game data including, (i) at least data relating to progress of said virtual game and (ii) a plurality of contents for a single type of operating instruction that are different according to an operation level of a player, in a storage medium;
determining whether or not it is time to display said operating instruction on said display device;
determining, when it is determined to be the time to display said operating instruction, whether or not to display said operating instruction based on the game data stored in said game data storage medium;
detecting an operation by said player, and determining the operation level of said player based on the detected operation; and
outputting, when it is determined to display said operating instruction, the operating instruction data corresponding to the operating instruction of a content to said display device according to the determined operation level, wherein
when said operating instruction is determined to be not displayed, said game program further makes said computer execute measuring a time period during which no operation by the player has been detected, and
when the time period measured is over a given period of time, the operating instruction data that corresponds to said operating instruction that has been determined not to be displayed is output.

9. A game apparatus comprising an operating instruction data storage device for storing operating instruction data for displaying an operating instruction for a virtual game on a display device, and that outputs a game screen of said virtual game to said display device, the apparatus configured to:
store game data including at least data relating to progress of said virtual game in the storage medium;
determine whether or not it is time to display said operating instruction on said display device;
determine, when it is determined to be the time to display said operating instruction, whether or not to display said operating instruction based on the stored game data; and
output, when it is determined to display said operating instruction, operating instruction data corresponding to the operating instruction to said display device,
wherein when a time period from a last play to a current play of said virtual game is over a predetermined time period, said operating instruction is displayed regardless of the game data stored in said game data storage device.

10. The game apparatus according to claim 9, wherein whether or not to display said operating instruction is determined based on a combination of an experience level based on the progress of said virtual game and on an overall time period of play of the virtual game.

11. A game controlling method for a game apparatus having one or more processors and that is provided with an operating instruction data storage device for storing operating instruction data for displaying an operating instruction for a virtual game on a display device and a game data storage device that stores game data including at least data relating to progress of said virtual game in a storage medium, and that outputs a game screen of said virtual game to said display device, the method comprising:
determining, via the one or more processors, whether or not it is time to display said operating instruction on said display device;
determining, when it is determined to be the time to display said operating instruction, whether or not to display said operating instruction based on the game data stored in said game data storage device; and
outputting, when it is determined to display said operating instruction, operating instruction data corresponding to the operating instruction to said display device,
wherein when a time period from a last play to a current play of said virtual game is over a predetermined time period, said operating instruction is displayed regardless of the game data stored in said game data storage device.

12. The game controlling method according to claim 11, wherein whether or not to display said operating instruction is determined based on a combination of an experience level based on the progress of said virtual game and on an overall time period of play of the virtual game.

13. A game system, comprising:
a display device configured to display image data; and
a game apparatus coupled to the display device and that is provided with an operating instruction data storage device for storing operating instruction data for displaying an operating instruction for a virtual game on the display device, and that outputs a game screen of said virtual game to said display device, the apparatus configured to:
store game data including at least data relating to progress of said virtual game in the storage medium,
determine whether or not it is time to display said operating instruction on said display device,
determine, when it is determined to be the time to display said operating instruction, whether or not to display said operating instruction based on the stored game data, and
output, when it is determined to display said operating instruction, operating instruction data corresponding to the operating instruction to said display device,
wherein when a time period from a last play to a current play of said virtual game is over a predetermined time period, said operating instruction is displayed regardless of the game data stored in said game data storage device.

14. The game system according to claim 13, wherein whether or not to display said operating instruction is determined based on a combination of an experience level based on the progress of said virtual game and on an overall time period of play of the virtual game.

* * * * *